United States Patent
De-Gol et al.

(10) Patent No.: US 11,612,824 B2
(45) Date of Patent: Mar. 28, 2023

(54) AUTOMATED GUIDED VEHICLES

(71) Applicant: Robocoaster Limited, Kingswinford (GB)

(72) Inventors: Gino De-Gol, Kingswinford (GB);
Rene Masey, Kingswinford (GB);
Bruno Bolsens, Kingswinford (GB)

(73) Assignee: ROBOCOASTER LIMITED, Kingswinford (GB)

( * ) Notice: Subject to any disclaimer, the term of this patent is extended or adjusted under 35 U.S.C. 154(b) by 553 days.

(21) Appl. No.: 16/634,782

(22) PCT Filed: Jul. 31, 2018

(86) PCT No.: PCT/GB2018/052187
§ 371 (c)(1),
(2) Date: Jan. 28, 2020

(87) PCT Pub. No.: WO2019/025787
PCT Pub. Date: Feb. 7, 2019

(65) Prior Publication Data
US 2020/0230508 A1    Jul. 23, 2020

(30) Foreign Application Priority Data
Jul. 31, 2017 (GB) .................................... 1712256

(51) Int. Cl.
*A63G 25/00* (2006.01)
*H02J 7/34* (2006.01)
*B60L 53/00* (2019.01)
*B60L 53/10* (2019.01)
*B60L 50/40* (2019.01)
*G05D 1/02* (2020.01)
(Continued)

(52) U.S. Cl.
CPC .............. *A63G 25/00* (2013.01); *B60L 50/40* (2019.02); *B60L 53/00* (2019.02); *B60L 53/10* (2019.02); *G05D 1/0217* (2013.01); *H02J 7/345* (2013.01); *H02P 3/14* (2013.01); *A63G 31/16* (2013.01)

(58) Field of Classification Search
CPC ......... A63G 25/00; A63G 31/16; B60L 53/00; B60L 50/40; B60L 53/10; G05D 1/0217; H02P 3/14
See application file for complete search history.

(56) References Cited

U.S. PATENT DOCUMENTS 5,839,554 A    11/1998 Clark
7,890,228 B2    2/2011 Redmann, Jr. et al.
(Continued)

FOREIGN PATENT DOCUMENTS

EP          2151097       2/2010
WO    WO 1995/05223      2/1995
(Continued)

OTHER PUBLICATIONS

International Search Report for PCT/GB2018/052187, dated Jan. 23, 2019, 5 pages.

*Primary Examiner* — Gertrude Arthur Jeanglaude
(74) *Attorney, Agent, or Firm* — Dority & Manning, P.A.

(57) ABSTRACT

The present invention relates to automated guided vehicles, hereinafter referred to as AGVs, and specifically to AGVs used for entertainment purposes. More specifically, the present invention relates to using in a passenger carrying AGV a capacitor or a plurality of capacitors as a power source.

17 Claims, 4 Drawing Sheets

(51) Int. Cl.
*H02P 3/14* (2006.01)
*A63G 31/16* (2006.01)

(56) References Cited

U.S. PATENT DOCUMENTS

| | | | | |
|---|---|---|---|---|
| 2010/0185353 A1* | 7/2010 | Barwick | ............... | E04H 6/36 |
| | | | | 701/23 |
| 2010/0308769 A1 | 12/2010 | Baba | | |
| 2014/0358330 A1* | 12/2014 | De-Gol | ............... | A63G 31/16 |
| | | | | 701/2 |
| 2017/0021282 A1* | 1/2017 | Comploi | ............ | G05D 1/0088 |

FOREIGN PATENT DOCUMENTS

| | | |
|---|---|---|
| WO | WO 2015/051190 | 4/2015 |
| WO | WO 2016/167712 | 10/2016 |

* cited by examiner

AUTOMATED GUIDED VEHICLES

PRIORITY CLAIM

This application is based upon and claims the right of priority under 35 U.S.C. § 371 to International Application No. PCT/GB2018/052187 filed on Jul. 31, 2018, which claims priority to GB 1712256.5 filed on Jul. 31, 2017, each of which is incorporated by reference herein in its entirety.

FIELD OF THE INVENTION

The present invention relates to automated guided vehicles, hereinafter referred to as AGVs, and specifically to AGVs used for entertainment purposes. More specifically, the present invention relates to automated guided vehicles being powered by at least one electric motor. The invention also relates to a system of automated guided vehicles comprising at least one automated guided vehicle and at least one charging station. The invention also relates to method steps carried out to control an AGV.

TECHNICAL BACKGROUND

Theme park rides typically utilise passenger carrying AGVs to provide an immersive entertainment experience. The AGV moves through a workspace or themed environment and its movement is synchronised with elements of the themed environment. Such elements may include, for example, scenery, props, animatronics, audio effects, visual or media based effects, pyrotechnic effects and olfactory effects. The vehicle is autonomously guided in so far that it its movement over a surface is not defined and constrained by a physical track. Such a track may include, for example, one or more rails or channels. The vehicle preferably has a programmable control system which may govern the movement of the AGV.

The carrier may be a passenger carrier. In such an embodiment, the passenger carrier may be configured so as to carry a single passenger. Alternatively, the passenger carrier may be configured so as to accommodate multiple passengers. The passenger carrier preferably includes safety restraints for passengers either individually or in adjacent groups.

Passenger carrying manipulators are well known, and are exemplified in the current art by, for example, PCT/GB2013/052989.

As the AGV is travelling without mechanical guidance, such as tracks, it is important that the autonomously guided vehicle functions independently from a permanent connection to an external power source. Therefore, it is known that an autonomously guided vehicle may include an on-board power source. In such an embodiment, the on-board power source may consist of one or more batteries. Said one or more batteries may include lead acid, nickel metal hydride or lithium ion type. As the time for recharging the batteries may be substantially long, the capacity of the batteries is usually chosen to last for a full working period of the AGV, e.g. the opening hours of the amusement park. During a working day, the AGVs may complete a high number of rides, e.g. starting at a passenger embarkation station to allow passengers to board the AGV, moving through the themed environment and subjecting the passenger to a number of predefined motions or movement, allowing the passengers to disembark at the station and returning to the embark station. Such a cycle may take in the range of two to ten minutes. The batteries of the AGV are continuously discharged by these rides. Usually the AGVs are recharged between the end of a working period and the beginning of the next working period, e.g. during the closing hours of the amusement park. This may give twelve to fourteen hours of recharging time. In order to last a full working period of, for example, eight to ten hours, the capacity of the batteries has to be chosen to be sufficiently high, which increases weight and corresponding inertial penalties as well as the commercial costs for the batteries.

Alternatively, the autonomously guided vehicle may be powered by a remote, off board power source. In such an embodiment, the autonomously guided vehicle may be powered by an overhead electrified grid system with conductive floor and an overhead power pick up device. Alternatively, the autonomously guided vehicle may be powered by an in floor inductive power pick up device. However, off board power sources provide further technical challenges, for example passenger safety. Furthermore as the available current provided by inductive pick-ups is typically limited in the low kW range, then the system must be perfectly aligned to the inductive coils for optimal efficiency.

It is therefore an objective of the invention to power an AGV with a power source which is easy to maintain and does not show the disadvantages of the prior art technologies.

SUMMARY OF THE INVENTION

The invention at least mitigates the problems of the prior art by providing passenger carrying automated guided vehicles with at least one capacitor as a power source for electrical consumers of the passenger carrying automated guided vehicle, particularly for at least one electric motor that propels the passenger carrying automated guided vehicle.

The advantage of the invention is that the at least one capacitor allows very high charging currents. Batteries store electrical energy in an electrochemical process, which is reversible as long as the charging current remains below a given limit. When the charging current exceeds the given limit, the electrochemical process changes into another electrochemical process, which is irreversible and the battery may eventually be even destroyed, or become nonviable. Using a capacitor as a power source does not require an electrochemical process and allows a much higher charging current than a conventional battery based on an electrochemical process. Therefore, the charging time is greatly reduced in comparison to a conventional battery and is essentially limited by the charging system. This allows the bank of capacitors to recharge several times during the working period and to extend the time of the working period beyond eight to ten hours. In fact, due to the short recharging time, an AGV with a capacitor as a power source would be operable 24 hours, 7 days a week, interrupted only by short pre-planned recharging intervals.

In an embodiment, for example where the capacity of a single capacitor is too low to store enough energy for at least one full working cycle of the AGV, and a plurality of capacitors may be used, in series or in parallel. In the following, the aforementioned capacitor is therefore referred to as a bank of capacitors. However, it should be kept in mind that in extreme cases, the bank of capacitors may consist of only a single capacitor. So far, however, even a single capacitor, commonly called "super capacitor" or "ultra-capacitor", is effectively a composition of a plurality of capacitors.

In a first aspect of the invention the passenger carrying automated guided vehicle comprises a charging module for charging the bank of capacitors. This charging module is specially adapted to the needs of the bank of capacitors.

In another aspect of the invention the passenger carrying automated guided vehicle comprises charging contacts for electrically contacting to an external charging station. As the time for charging the bank of capacitors is short, the bank of capacitors can be charged in-between the working period of the AGV. Particularly, when the charging contacts are designed as sliding contacts for connecting to a charging rail, the bank of capacitors may be charged when the AGV is following a specific charging path where power rails may be arranged at the side wall of a charging station and are configured to mate with the charging contacts arranged on the side wall of a body of the automated guided vehicle. The power rail may also be located at the floor or ceiling of the charging station. As the charging time is short, the charging path may be located in-between the disembarkation station, where all passengers have to leave the AGV, and the embarkation station, whereupon new passengers are allowed to embark the AGV. As no passengers are allowed in-between stations and the live contacts are carefully protected, passengers are not exposed to any risks presented by accidental exposure to live wires, rails or contacts. Advantageously, this allows the AGV to charge whilst the AGV is moving between passenger disembarkation and embarkation points thus minimising any delays to the passengers whilst the AGV charges.

In another aspect of the invention the passenger carrying automated guided vehicle alternatively may comprise contactless charging means for contactless transferral of energy from an external charging station. These means may be an induction loop in the AGV and an induction loop in the floor. As the charging time is short, the AGV may follow for a short time a charging path defined by the induction loop and is recharged while following this charging path. As the recharging time is short, this charging path may be part of the animated path when carrying passengers.

In another aspect of the invention the bank of capacitors of the passenger carrying automated guided vehicle is charged up to a high voltage in the range of, for example, 500 to 700 Volts. This could correspond to the peak-to-peak voltage of approximately 565 Volts that a charging station may produce as a charging voltage from an AC voltage of 400 Volts, the usual three-phase mains electricity in Europe. Compared to the nominal voltage of 12 to 48 Volts of the typically used batteries, the combination of the high charging current of the bank of capacitors and the high voltages and power that can be extracted from a fully charged bank of capacitors is significantly increased. Similarly, in countries with a differing three-phase mains voltages, such as 480 Volts in the US, the preferred charging voltage of the bank of capacitors may be approximately 678 Volts. Of course, the charging station may comprise a voltage converter that would allow a higher voltage of, for example, 690 Volts or even to use the maximum voltage that the bank of capacitors can be charged with.

In another aspect of the invention the passenger carrying automated guided vehicle is equipped with at least one high voltage electric motor, the nominal voltage of which is essentially 400 Volts. These industrial voltage motors are in widespread use for industrial automation and may be used for powering larger AGVs with a heavier payload. Due to practical reasons the batteries of AGVs were never connected in series to provide very high voltages, and AGV applications utilise low voltage motors instead. Thus by using the at least one high voltage electric motor a higher powered AGV may be provided. In another aspect of the invention, the capacitor feeds power directly to the DC inputs (DC bus) of the motor controller, thus allowing the use of a wide range of the more efficient high voltage (400V plus) motors on a mobile systems.

In another aspect of the invention, the passenger carrying automated guided vehicle further comprises a converter or drive that essentially converts the DC varying capacitor voltages into sinusoidal waveforms to develop power and torque to make the electrical motor deliver the commanded speed. The drive system has been designed to allow for a widely varying input voltage such as is typical for a capacitor bank, for example, by pulse width modulation to maximally exploit the stored energy of the bank of capacitors. This helps ensure that the performance of the vehicle remains unchanged/constant for a wide range of capacitor voltages and/or discharging voltage states of the capacitor. Additionally the converter may include means for up converting voltage lower than required by the motors, and this exploits modes of the energy stored in the capacitors.

In another aspect of the invention, the DC voltage bus of the motor drive amplifiers of the passenger carrying automated guided vehicle may be fed high voltage DC power directly from the capacitor bank, thus negating the requirement of any power conditioning or voltage set up or down conversions. By using a direct connection without conversion steps between capacitor bank and drive section, the setup allows for highly efficient regenerative braking and energy recovery. Furthermore, the efficiency of this process is much higher than in the case of conventional battery technology where regenerative efficiency is mainly determined and limited by electrochemical processes.

In another aspect of the invention, the passenger carrying automated guided vehicle is operable to follow a predetermined path over a floor, from a start point to an end point thus defining the route which the automated guided vehicle travels. The automated guided vehicle is further being operable on the way back from the end point to the start point A to frequent a charging station for recharging the at least one bank of capacitors at the charging station. Such a route defines a charging path for the AGV.

Depending on the capacity chosen for the bank of capacitors and the power used during a working cycle, it may not be necessary to charge the AGV between each working cycle. Therefore, it may be possible to use a fully charged bank of capacitors for several consecutive working cycles and charge the AGV for example only every third working cycle. The AGV may therefore complete a number of working cycles and be guided on a charging path only so often when the power remaining in the bank of capacitors is almost exhausted.

In another aspect of the invention the passenger carrying automated guided vehicle is adapted to follow a path over a floor from a start point to an end point which the automated guided vehicle is intended to travel. In this aspect of the invention the AGV comprises a charge control module for measuring a remaining capacity of the bank of capacitors, for example at the end point, comparing the measured capacity with a pre-defined value that indicates the minimum capacity needed for a AGV to complete a full tour, for example from the end point to the start point, from the start point to the end point, and from the end point to a charging station. When the charge control module determines that the measured remaining capacity is below the pre-defined capacity, the charge control module instructs the AGV to follow a route a charging station.

In another aspect of the invention, the bank of capacitors of the passenger carrying automated guided vehicle is arranged in a removable assembly. This allows for example to use two banks of capacitors for one AGV. One bank of capacitors is charged externally, while a second bank of capacitors is used in the AGV as the power source. When the AGV passes the charging station, the discharged bank of capacitors is replaced by the second bank of capacitors and the discharged bank of capacitors is recharged. This gives as much time for charging one of the bank of capacitors as the time of discharging the other bank of capacitors during a working cycle.

The invention also relates to a system of at least one passenger carrying automated guided vehicles with at least one capacitor as a power source for electrical consumers of the passenger carrying automated guided vehicle, and a charging station adapted for charging the capacitor of the passenger carrying automated guided vehicles. The system may further comprise guiding means for defining a travel path having a start point and an end point, and a return path between the end point and the start point. The guiding means are adapted to provide a charging path that the AGV has to follow for recharging the capacitor of the AGV at the charging station.

The guiding means for example, define the charging path preferably between the end point and the start point. Thus, the AGV is charged after the passengers had to leave the AGV at the end point and before new passengers are allowed to embark the AGV at the start point. The charge path may follow the normal return path between the end point and the start point. This would be the case if the AGV has to be recharged after each completion of a working run between the start point and the end point. Alternatively, the charge path may be different to the return path. This would be a preferred solution especially when the AGV has to be recharged only after a number of completed working runs. In this case, the AGVs that do not need to be recharged are guided along the return path and those which need to be recharged are guided along the charge path. This allows, for example, the AGV to use more time in the charge path for recharging and allow the other AGVs, which do not need to recharge, to run more quickly through the return path.

The invention also relates to a method of operating a passenger carrying automated guided vehicle comprising the steps of providing the passenger carrying automated guided vehicle with a capacitor as a source for electrical energy; charging the capacitor of the passenger carrying automated guided vehicle with electrical energy; using the electrical energy stored in the capacitor to supply to the electrical motors of the passenger carrying automated guided vehicle.

The method for operating a passenger carrying automated guided vehicle may further include the steps of guiding the passenger carrying automated guided vehicle along a defined travel path from a start point to an end point; guiding the passenger carrying automated guided vehicle from the end point to a charging station and recharging the capacitor of the passenger carrying automated guided vehicle; guiding the passenger carrying automated guided vehicle from the charging station to the start point.

The method for operating a passenger carrying automated guided vehicle may further include the steps of measuring the remaining capacity of the capacitor of the passenger carrying automated guided vehicle; comparing the measured remaining capacity of the passenger carrying automated guided vehicle with a pre-defined value; in case the measured remaining capacity of the capacitor of the passenger carrying automated guided vehicle is below the pre-defined threshold, causing the passenger carrying automated guided vehicle to travel to a charging station for recharging the capacitor of the passenger carrying automated guided vehicle.

In another aspect of the invention the method of operating a passenger carrying automated guided vehicle further includes the steps of measuring the remaining capacity of the capacitor of the passenger carrying automated guided vehicle and comparing the measured remaining capacity of the passenger carrying automated guided vehicle with a pre-defined value. In case the measured remaining capacity of the capacitor of the passenger carrying automated guided vehicle is below the pre-defined threshold, the passenger carrying automated guided vehicle is caused to travel to a charging station for recharging the capacitor of the passenger carrying automated guided vehicle. These method steps increase the autonomy of the AGV, as each AGV decides individually before it starts a new working cycle, whether sufficient energy is left to perform another working cycle or if it is time to get recharged. This is particularly advantageous when the AGV is operated under constantly varying conditions, such as load variations (passengers with lower weight, such as children and passengers with higher weight, such as adults) and variations in the distances travelled by the AGV from a start point to an end point, for example, when different paths are possible between the start and end points.

In another aspect of the invention the system provides wires embedded in a surface over which the passenger carrying automated guided vehicle is intended to travel for defining a limit for the AGV. The system broadcasts a radio signal using the wires as a transmit antenna. A safety controller is adapted to stop the AGV in the event that the peripheral sensor fails to detect the radio signal broadcast by the limit defining wire.

In another aspect of the invention a passenger carrying automated guided vehicle used for entertainment purposes is propelled by at least one electric motor, wherein the automated guided vehicle comprises at least one capacitor as a power source for the at least one electric motor and attendant motor controller (a controller associated with the electric motor), whereby the capacitor feeds power directly to the DC inputs of the motor controller, allowing the use of a wide range of more efficient high voltage motors, for example electrical motors with a nominal supply voltage of 400 Volts and more. Whereas with battery operated systems a high voltage may be cumbersome to be achieved due to the number of battery cells, a capacitor can be easily sized for a higher voltage as capacitors are available with a far higher nominal voltage than a battery cell. Thus the number of capacitors to be combined to an arrangement of capacitors with a specific voltage and capacity is far lower than to the number of battery cells required for the same voltage and capacity. For this reason battery operated AGVs use an arrangement of batteries with a lower voltage and therefore use electric motors with a lower voltage. However, the higher voltage that is available with the capacitors enables the construction of faster accelerating AGVs.

In another aspect of the invention the automated guided vehicle is propelled by at least one electric motor, wherein the automated guided vehicle comprises at least one capacitor as a power source for the at least one electric motor and attendant motor controller, whereby the motor feeds regenerative braking currents directly back into the capacitor from the DC bus. Utilising regenerative braking currents significantly improves efficiency and endurance of the AGV in comparison to prior art AGVs.

In another aspect of the invention the automated guided vehicle is propelled by at least one electric motor, wherein the automated guided vehicle comprises at least one capacitor as a power source for the at least one electric motor and attendant motor controller.

In another aspect of the invention the AGV comprises one or more safety isolation units. Each safety isolation unit comprises, for example, a pair of redundant high-voltage contactors. The safety isolation units are monitored and controlled via an on-board safety PLC system, thereby ensuring that the capacitor can be safely disconnected from both the charging system input and the motor controller DC bus output, for example in a detected emergency situation with a shutdown of the system or during maintenance interventions. This aspect of the invention ensures that the capacitor cannot accidentally discharge during maintenance interventions or shutdowns.

In another aspect of the invention the automated guided vehicle being propelled by at least one electric motor comprises a capacitor based power module, such power module incorporating a series load, for example, a high-pulse-load pre-charge resistor, to limit inrush current to the motor controllers during initial or start-up connection.

In another aspect of the invention the automated guided vehicle is propelled by at least one electric motor, wherein the automated guided vehicle comprises a capacitor based power module incorporating a residual motor controller power discharge resistor. This discharge resistor is preferably sized to deplete the motor power within a safety prescribed limit (typically less than 1 minute), allowing safe manual disconnection of the power module from the vehicle input power connections.

In another aspect of the invention the automated guided vehicle is propelled by at least one electric motor, wherein the automated guided vehicle comprises a capacitor based power module utilising an "isolated terra" (IT) earthing system and comprising an Insulation Monitoring Device. The insulation Monitoring Device allows the automatic detection of a charging system fault. When a charging system fault is detected, the Insulation Monitoring Device may safely shut down the charging process, for example with an attendant alarm message.

In another aspect of the invention the automated guided vehicle being propelled by at least one electric motor, wherein the automated guided vehicle comprises a capacitor based power module incorporating voltage, current and temperature measuring devices, such devices monitoring the power and temperature management and cooling systems, the combination of which are deemed essential for the effective operation and longevity of such an arrangement.

In another aspect of the invention the automated guided vehicle is propelled by at least one electric motor, wherein the automated guided vehicle comprises a capacitor based power module incorporating an integral switched mode power supply converting high voltage (for example 600+ volts DC) down to low voltage (24 volts DC) for control and safety monitoring functions and power. Additionally in a further aspect of the invention an Uninterruptable Power Supply (UPS) provides back up power for the safety and control functionality in the event of a switched mode power supply failure. Preferably the uninterruptable power supply is charged by the integral switched mode power supply with the low voltage.

In another aspect of the invention, the automated guided vehicle is configured to run in at least a first mode and a second mode. In the first mode the AGV is carrying passengers as described above. The second mode for example is a stand-by mode, where the AGV does not carry passengers. In the stand-by mode the autonomous guided vehicle, in an embodiment, performs various maintenance tasks, for example battery and/or capacitor power module management tasks which it would not normally perform whilst carrying passengers. Such autonomous tasks therefore aide in battery and/or capacitor power module power management of the autonomous guided vehicle.

In the stand-by mode the AGV operates automatically whilst unattended allowing for example autonomous overnight monitoring of the power and capacitor cell balancing functions. If required the AGV may autonomously drive to the charging station for a charge cycle. When the power module energy level approaches a critical level, the AGV is configured to inhibit the balancing function, thus extending the available dormant stand-by time a module is serviceable between charging cycles.

DETAILED DESCRIPTION

Embodiments of the present invention will be described with reference to the accompanying drawings in which.

Figure 2:
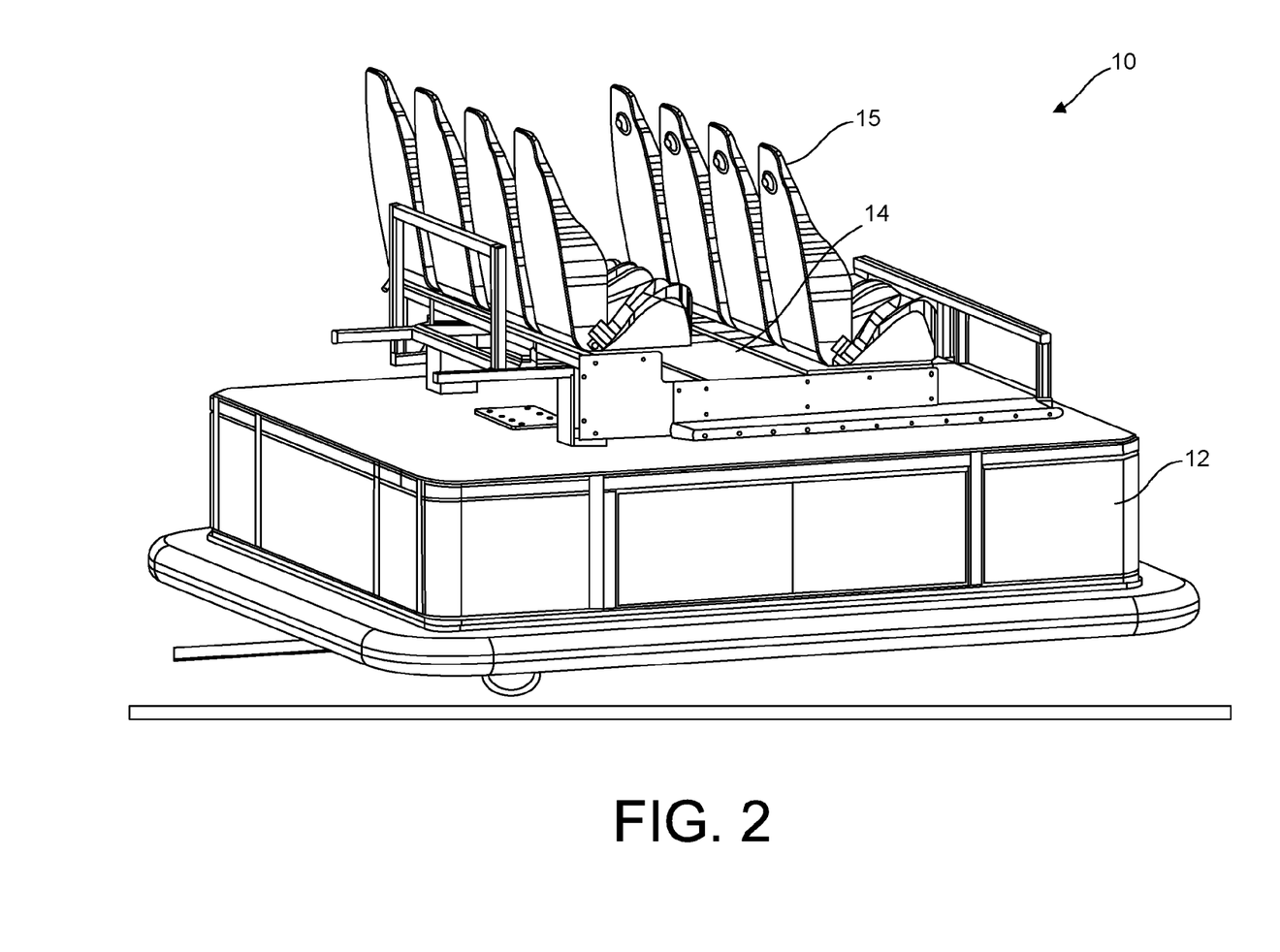
FIG. 2 shows perspective view of an AGV.

Referring firstly to FIG. 2, there is shown an automated guided vehicle, hereinafter referred to as an AGV, generally designated 10. In the embodiment shown, the AGV includes a base 12, and a passenger module 14 mounted on top of the base 12. In the embodiment shown, the passenger module 14 is provided with two rows of four seats 15. The passenger module may be unmovably fixed to the base or may be actuated by a manipulator (not shown). Passenger carrying AGVs 10 of the type described above are typically used in theme parks to provide passengers with an immersive entertainment experience. The AGVs typically move through a themed environment relating to, for example, a film or video game. The themed environment may include such elements as scenery, props, animatronics, audio effects, visual or media based effects, pyrotechnic effects and olfactory effects. The aforementioned elements are provided by way of example only and are not intended to be limiting. As the AGV 10 moves through the themed environment its movement, and, if provided with a manipulator, also the movement of passenger module 14, is synchronised with the themed environment elements to provide an immersive entertainment experience. The configuration of the AGV 10 is shown by way of example only and is not intended to be limiting.

Figure 1:
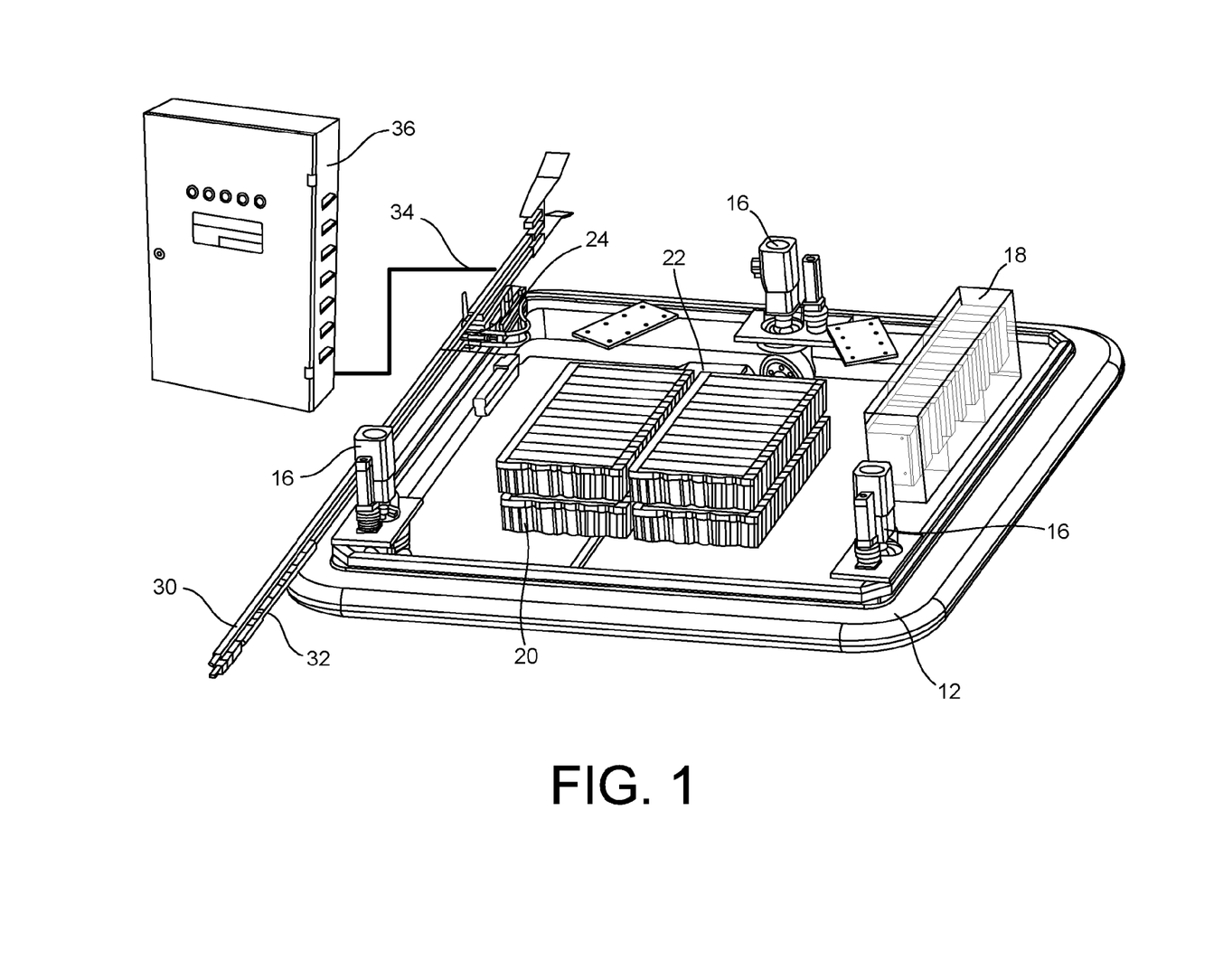
FIG. 1 shows a perspective view of the interior base of a passenger carrying AGV.

Now turning to FIG. 1, the base 12 includes a number of drive units 16 which enable the AGV 10 to follow an intended path. In the embodiment shown the three drive units 16 are located in triangular projections of the base 12. The automated guided vehicle 10 may preferably be provided with one or more on-board power sources configured to provide power to the manipulator 14, combined drive and steering units 16, control and a guidance systems 18 that may be fitted. According to the invention the power source of the automated guided vehicle 10 is provided by a bank of capacitors 20. Such capacitors may be located within the vehicle 10 in the base 12. Alternatively, the one or more capacitors may be located in portions of the vehicle 12 that extend for example from the back of the base 12.

The capacitors may be carried by a removable assembly which enables the capacitors to be removed from the vehicle 12 for recharging and/or maintenance. The advantages of capacitors are that they accept very high charging currents, which are higher than for batteries. This short recharging period of a capacitor make it possible to change the recharging strategy. Instead of providing as much capacity that allows the capacitor to provide sufficient energy for a full working day, due to the fast charging times the capacity of the capacitor may be chosen to last only for one show cycle, or even a few show cycles.

Preferably the removable assembly is implemented as a capacitor based power module built into a sealed enclosure and constructed as a swappable cassette. This allows the unit to be readily replaced by either an automated or manual process.

This permits the capacity of the bank of capacitors 20 for a given application to be significantly smaller (by means of faster and more frequent charging) to an equivalent battery capacity that has to provide energy for a whole working day. The bank of capacitors 20 of an AGV for example may be chosen so that it has sufficient energy to complete just a single show cycle with the passengers. Whereas for a typical AGV with a large payload, the battery weight could easily be in the order of one tonne or more in order to provide the energy required for a whole working day, by contrast, the weight of the bank of capacitors (by means of fast charging during the same operational cycle and equivalent tasks, and only having to provide enough energy for approximately 2 or 3 complete operational cycles) is only a fraction of the size and weight of the substantial battery pack.

Figure 3:
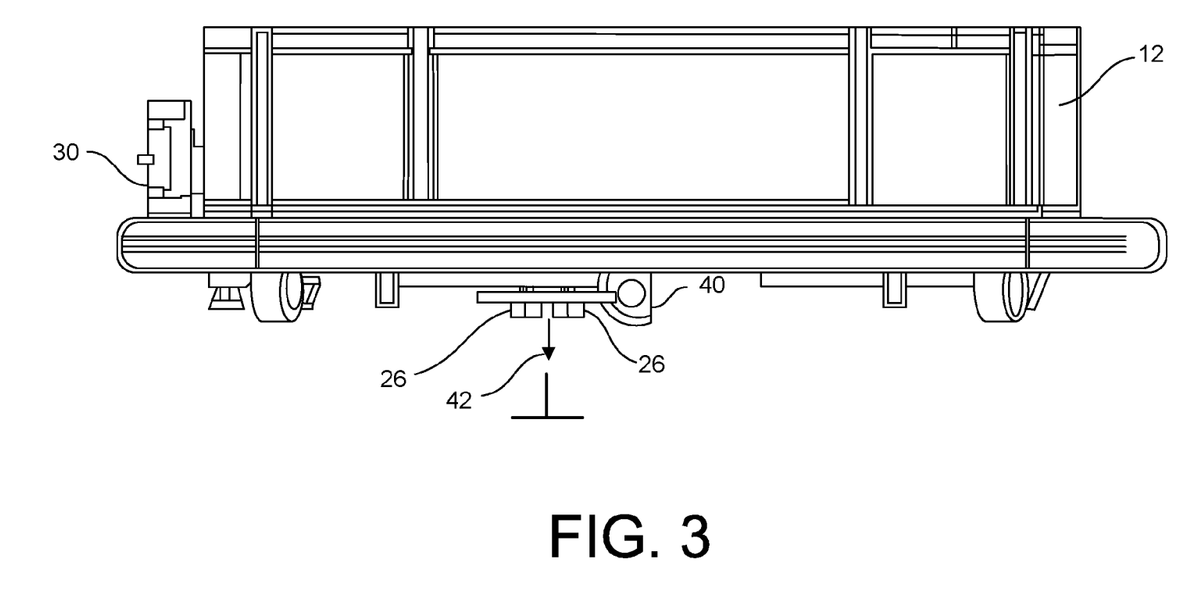
FIG. 3 shows a back view of an AGV and a guide rail

By way of example, for an operational (ride) cycle of 180 seconds, a capacitor may be recharged after one, two, or more complete operational cycles (say 300 seconds) by accordingly adapted charging means 22 in for example 60 seconds, for example during a standstill or station task. These charging means 22 may comprise contacts 24 that connect to mating contacts 32 in the power rail 30. The contacts 34 of the of the power rail are supplied with electrical energy by a charging power source 36. A cable 34 connects the power rail 30 to the charging station 36. A typical charging power rating would be in the order of between 30 and 60 kW for such a bank of capacitors.

The AGV alternatively may be charged via contactless means, for example by a primary coil located in the floor or a wall of the installation and a corresponding secondary coil in the bottom or a side wall of the AGV. Similarly to a transformer, energy can be transmitted from the primary coil to the secondary coil. In the case where charging time needs to be kept low, the AGV can be charged at a disembarkation station, usually defining the end point B of a show cycle, while passengers get off the AGV, and/or at the embarkation station, usually the start point A of a show cycle, while passengers get on to the AGV. If a longer charging time needs to be chosen, then there might be a charging station installed in-between the disembarkation station and the embarkation station. Alternatively, when the capacity of the capacitor of the AGV is chosen to be sufficiently big, then the AGV may serve several rides before it drives itself to a charging station that is not part of the show path or the return path.

These charging means may comprise contacts that charge the AGV whilst it is moving, for example, at the disembarkation station and/or the embarkation station and/or between the disembarkation station and the embarkation station.

In an alternative embodiment, the AGV may have a charge control module which measures the capacity of the capacitor at the end of a ride and compares the measured capacity with a pre-defined value that indicates the minimum capacity needed for an AGV to complete a full ride. Preferably this pre-defined value includes a margin for error to ensure that the AGV under all circumstances competes at least one full run. In case the measured value is below this pre-defined value, the AGV will not proceed after leaving the disembarkation station to the embarkation station but rather proceeds to a quick charging station. Once the capacitor is recharged at the recharging station the AGV will re-join the queue of AGVs at the embarkation station.

The automated guided vehicle 10 is further provided with a guidance system 18. The guidance system 18 is operable to guide the automated guided vehicle 10 through the environment in which it is used. One embodiment of a suitable guidance system is for example described in WO 2014/076471 A1.

FIG. 3 shows the AGV from the back. As for connecting with contacts to the power rail 30, the AGV needs to follow accurately a track in parallel to the power rail 30 and as such, a guiding rail 40 may be provided that is fixed to the floor (not shown) of the installation. The AGV has corresponding guide rollers 26 which engage with the guide rail, as indicated by arrow 42. The guide rail 40 and the guide rollers 26 force the AGV to follow the charging path C and to avoid any bad contacts between the contacts 24 of the AGV and the contacts of the power rail 30.

Figure 4:
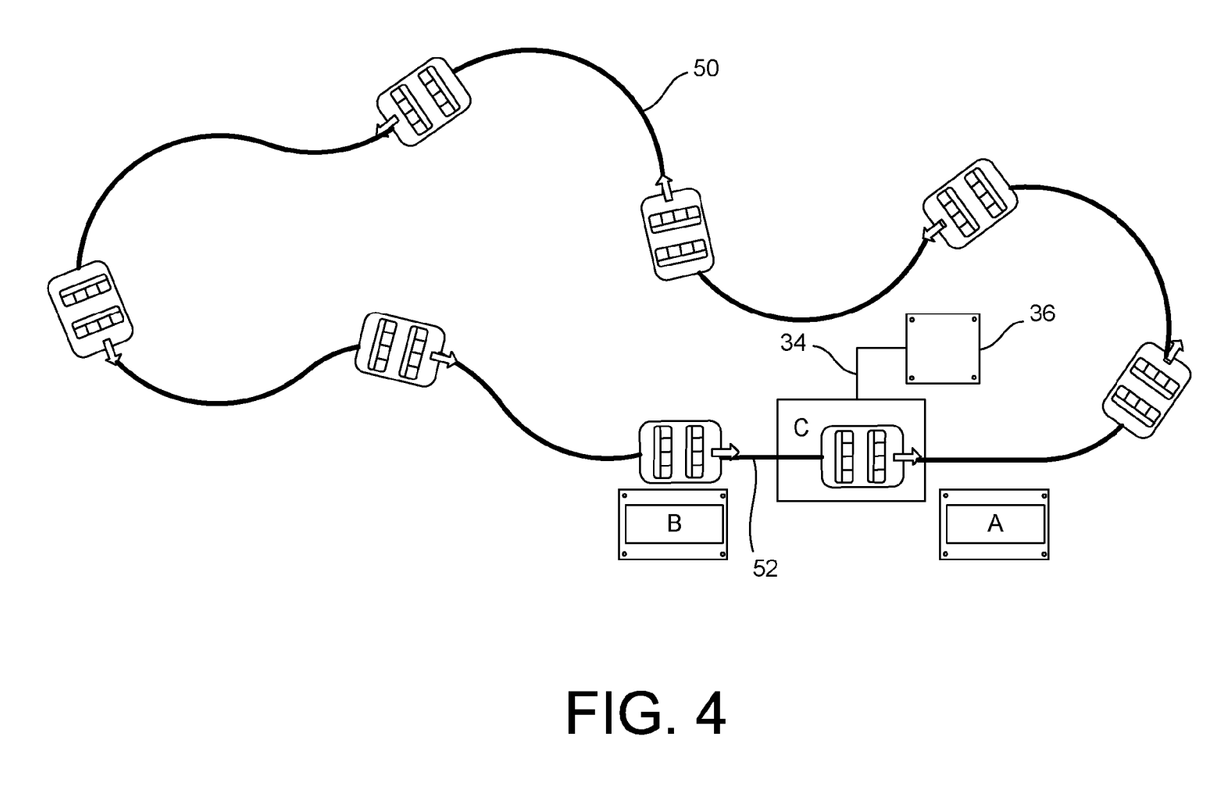
FIG. 4 shows a schematic top plan view of AGVs following a path.

FIG. 4 shows a schematic view of a travel path, generally designated for the AGV 10. The travel path 50 has a start point A and an end point B and extends in a sinuous manner between the start and endpoints A, B. In a typical themed environment, the travel path 50 is in the form of a closed loop such that the AGVs circulate around the travel path 50. The start point A may be defined by the passenger embarkation point A of the path 50, whereas the end point B may be defined by the passenger disembarkation point of the path 50. The travel path 50 may be defined in the themed environment by a guidance wire which is embedded in the floor of the environment. A transmitter is connected to the wire such that a radio signal of a predetermined frequency is broadcast from the wire. The AGV 10 is provided with an appropriate sensor which is able to detect the radio signal. Markers are typically provided in the floor to assist the AGV 10 in determining its position on the travel path 50. Alternatively, the travel path 50 may be a virtual path, defined only in software, as a set of time-based coordinate positions. The AGV follows this pre-programmed path, using its guidance system 18 to periodically correct its position. Between the disembarking station B and the embarking station A is a return path 52 which closes the travel path 50 and the return path 52 to a closed loop. Alternatively, the system may have a dedicated charging path that is separate to the return path 52 allowing AGV to directly go from the end point B to the start point A without using the charging station 36.

Typically, the AGV 10 is configured to travel for the majority of the path 50 between start point A and end point B at a steady rate. At predetermined points along the travel path 50 the AGV 10 may undertake a dynamic movement operation. Such dynamic movement operations include, for example, lateral translation movements, spins, helical spins, slides in or contrary to the direction of movement of the vehicle, periods of rapid acceleration and deceleration, transitions into reverse, sharp turns or combinations of the foregoing.

According to an aspect of the invention, the AGV is configured to operate in a stand-by mode. In the stand-by mode the autonomous guided vehicle enters in a different mode of operation, one where it does not carry passengers and preferably operates at a lower speed so as to reduce energy consumption or shorter motion cycle so as to reduce the charging cycle times. Thus the stand-by mode defines a different mode of operation for the AGV.

According to a further aspect of the invention, there is provided a system for autonomously monitoring the power and cell balancing of an AGV whilst operating in a stand-by mode. An AGV operating in stand-by mode is able to operate automatically whilst unattended. As such, the system is configured to monitor certain aspects of an AGV whilst the AGV is operating in stand-by mode. In an embodiment, the system monitors the power and cell balancing of an AGV overnight. Alternatively, the system may monitor the power and cell balancing of an AGV during a period of low activity or low demand. Preferably, the system is configured to monitor the power and cell balancing of a plurality of AGVs.

In an embodiment, the system is configured to monitor the power and cell balancing of an AGV such that, when the power module energy level of the AGV approaches a critical level, the balancing function performed by the system can be inhibited for the AGV. Preferably, the critical level is a pre-determined value which is the same for every AGV. Alternatively, the critical level can be automatically determined by the system based on information collected from the AGV regarding the cell's prior usage and performance.

Beneficially, this allows for the available dormant stand-by time to be extended thus making the period in which a module is serviceable between charging cycles longer. This in turn provides for a more efficient system which is easier to maintain. Furthermore, inhibiting cell balancing when the power module energy level approaches a critical level helps to avoid possible damage to the cells through over charging or substantially imbalanced loads.

According to an aspect of the invention, the system is configured in either attended or unattended modes to demand that an AGV enter a charge cycle. Preferably, the system demands that an AGV enter a charge cycle when the power module energy level indicates that charge is required. Alternatively, the system may demand that an AGV enter a charge cycle at a specific point in time and for a pre-defined period of time.

In an embodiment, the monitoring and control of the power and cell balancing of an AGV is performed by a module of the system. Preferably, the module is implemented in software. Alternatively, the module may be implemented in hardware, or in a combination of hardware and software.

The invention claimed is:

1. A system for guiding an automated guided vehicle for carrying passengers used for entertainment purposes, comprising the automated guided vehicle for carrying passengers and guiding means, the automated guided vehicle being propelled by at least one electric motor, wherein the automated guided vehicle comprises at least one capacitor as a power source for the at least one electric motor, the automated guided vehicle being operable to follow a path over a floor from a start point (A) to an end point (B) which the automated guided vehicle is intended to travel, the automated guided vehicle further being operable on a return path back from the end point (B) to the start point (A) to frequent a charging station (C) for recharging the at least one capacitor at the charging station (C), wherein the charging station (C) forms part of the path from the end point (B) to the start point (A) and wherein the automated guided vehicle is charged via a power rail.

2. The system for guiding the automated guided vehicle for carrying passengers as claimed in claim 1 wherein the automated guided vehicle further comprises a charging module for charging the at least one capacitor.

3. The system for guiding the automated guided vehicle for carrying passengers as claimed in claim 2 wherein the automated guided vehicle further comprises charging contacts for electrically contacting to an external charging station, in particular wherein the charging contacts are sliding contact for connecting to a charging rail, or alternatively wherein the automated guided vehicle further comprises contactless charging means for contactless transferring energy from an external charging station.

4. The system for guiding the automated guided vehicle for carrying passengers as claimed in claim 1 wherein the at least one capacitor is charged up to essentially 690 Volts, in particular wherein the at least one electric motor is a motor specified for a nominal voltage of essentially 400 Volts, in particular wherein the capacitor feeds power directly to the DC inputs (DC bus) of the motor controller.

5. The system for guiding the automated guided vehicle for carrying passengers as claimed in claim 1 wherein the automated guided vehicle further comprises a converter for converting the electrical energy delivered by the at least one capacitor to supply the electrical motor with the level of electrical energy as a function of the actual voltage of the at least one capacitor and the energy demand of the electrical motor to deliver a commanded speed and respective torque.

6. The system for guiding the automated guided vehicle for carrying passengers as claimed in claim 1 wherein the at least one capacitor is in a removable assembly, in particular wherein the removable assembly is implemented as a capacitor based power module built into a sealed enclosure and constructed as a swappable cassette.

7. The system for guiding the automated guided vehicle for carrying passengers as claimed in claim 1 wherein the automated guided vehicle comprises a charge control module for measuring a remaining capacity of the capacitor, compare the measured capacity with a pre-defined value that indicates the minimum capacity needed for the automated guided vehicle to complete at least a tour from the start point (A) to the end point (B), and from the end point (B) to a charging station (C) and when the charge control module finds that the measured remaining capacity is below the pre-defined capacity, the charge control module initiates to guide the automated guided vehicle to the charging station (C).

8. The system for guiding the automated guided vehicle for carrying passengers as claimed in claim 1 whereby the motor feeds regenerative braking currents directly back into the capacitor.

9. The system for guiding the automated guided vehicle for carrying passengers as claimed in claim 1, wherein the automated guided vehicle further comprises one or more safety isolation units configured to disconnect the capacitor from both a charging system input and a motor controller DC bus output.

10. The system for guiding the automated guided vehicle for carrying passengers as claimed in claim 1 comprising a capacitor based power module, such power module incorporating a series load for limiting inrush current to the motor controllers and/or a residual motor controller power discharge resistor for depleting the motor power.

11. The system for guiding the automated guided vehicle for carrying passengers as claimed in claim 1 wherein the automated guided vehicle comprises a capacitor based power module utilising an "isolated terra" earthing system and further comprises an Insulation Monitoring Device.

12. The system for guiding the automated guided vehicle for carrying passengers as claimed in claim 1 wherein the automated guided vehicle comprises a capacitor based power module incorporating an integral switched mode power supply converting high voltage down to low voltage for control and safety monitoring functions and power, additionally the automated guided vehicle further comprising an uninterruptable power supply (UPS) for providing back up power for the safety and control functionality in the event of a switched mode power supply failure, wherein the uninterruptable power supply preferably is charged by the integral switched mode power supply with the low voltage.

13. The system for guiding the automated guided vehicle for carrying passengers as claimed in claim 1 wherein the automated guided vehicle is configured to run in at least a first operational mode, performing tasks in the first operational mode, and in a second operational mode, performing tasks in the second operational mode that are different to tasks performed in the first operational mode.

14. The charging station (C) adapted to charge the automated guided vehicle as claimed in claim 1 wherein the charging station (C) provides contacts that correspond to the charging contacts of the automated guided vehicle, and/or contactless means that correspond to the contactless charging means of the automated guided vehicle, respectively, preferably providing a charging voltage of substantially 690 Volts.

15. A method for operating a system for guiding an automated guided vehicle for carrying passengers comprising the steps of:
  providing the automated guided vehicle with a capacitor as a source for electrical energy;
  charging the capacitor of the automated guided vehicle with electrical energy;
  using the electrical energy stored in the capacitor to supply electrical motors of the automated guided vehicle;
  guiding the automated guided vehicle along a defined travel path from a start point (A) to an end point (B);
  guiding the automated guided vehicle from the end point (B) to a charging station (C) and recharging the capacitor of the automated guided vehicle; and
  guiding the automated guided vehicle from the charging station (C) to the start point (A).

16. The method as claimed in claim 15 and further including the steps of:
  measuring the remaining capacity of the capacitor of the automated guided vehicle;
  comparing the measured remaining capacity of the automated guided vehicle with a pre-defined value;
  in case the measured remaining capacity of the capacitor of the automated guided vehicle is below the pre-defined threshold causing the automated guided vehicle to travel to a charging station for recharging the capacitor of the automated guided vehicle;
  providing a radio signal broadcasting limit defining wire embedded in a surface over which the automated guided vehicle is intended to travel;
  operating the automated guided vehicle so that it follows an intended travel path; and
  causing the safety controller to stop the vehicle in the event that the peripheral sensor fails to detect the radio signal broadcast by the limit defining wire.

17. The method as claimed in claim 15 and further including the steps of:
  measuring the remaining capacity of the capacitor of the automated guided vehicle;
  comparing the measured remaining capacity of the automated guided vehicle with a pre-defined value;
  in case the measured remaining capacity of the capacitor of the automated guided vehicle is below the pre-defined threshold causing the automated guided vehicle to travel to a charging station for recharging the capacitor of the automated guided vehicle;
  providing a wireless radio signal broadcasting real-time safety information from a master controller and an optically based safety and vision based navigation system;
  operating the automated guided vehicle so that it follows an intended travel path; and
  causing the safety controller to stop the vehicle in the event that the peripheral sensor fails to detect the wireless radio signal broadcast by the master station controller or an obstruction or error occurs in the optically based safety and vision based navigation system.

* * * * *